US011187399B2

(12) United States Patent
Takai

(10) Patent No.: US 11,187,399 B2
(45) Date of Patent: Nov. 30, 2021

(54) ILLUMINATION DEVICE CAPABLE OF CHANGING IRRADIATION DIRECTION OF IRRADIATION LIGHT FROM LIGHT-EMITTING PORTION, IMAGING APPARATUS, AND METHOD OF CONTROLLING THE SAME

(71) Applicant: CANON KABUSHIKI KAISHA, Tokyo (JP)

(72) Inventor: Junji Takai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 16/702,258

(22) Filed: Dec. 3, 2019

(65) Prior Publication Data

US 2020/0103096 A1     Apr. 2, 2020

Related U.S. Application Data

(63) Continuation of application No. PCT/JP2018/021337, filed on Jun. 4, 2018.

(30) Foreign Application Priority Data

Jun. 9, 2017    (JP) .............................. JP2017-114359

(51) Int. Cl.
*F21V 14/02*     (2006.01)
*G03B 15/05*     (2021.01)
(Continued)

(52) U.S. Cl.
CPC .......... *F21V 14/02* (2013.01); *G03B 15/0431* (2013.01); *G03B 15/05* (2013.01); *H04N 5/2256* (2013.01); *H04N 5/2354* (2013.01); *H05B 47/155* (2020.01); *H05B 47/16* (2020.01); *G03B 2215/0521* (2013.01)

(58) Field of Classification Search
CPC ................ G03B 2215/0521; G03B 2215/0528
See application file for complete search history.

(56) References Cited

U.S. PATENT DOCUMENTS

| 8,449,141 | B1 * | 5/2013 | Hinrichs | ................. F21V 21/30 362/235 |
| 10,678,220 | B2 * | 6/2020 | Farnik | .................. G05B 19/416 |
| 2015/0062861 | A1 * | 3/2015 | Yamashita | .............. F21V 14/02 362/5 |

FOREIGN PATENT DOCUMENTS

| CN | 104136987 A | 11/2014 |
| CN | 104246600 A | 12/2014 |

(Continued)

*Primary Examiner* — Clayton E. LaBalle
*Assistant Examiner* — Leon W Rhodes, Jr.
(74) *Attorney, Agent, or Firm* — Canon U.S.A., Inc. IP Division

(57) ABSTRACT

A drive unit changes an irradiation direction of irradiation light from a light-emitting portion. A setting unit sets the irradiation direction of the irradiation light from the light-emitting portion. A control unit controls the drive unit. Depending on a cause of which the irradiation direction of the irradiation light from the light-emitting portion changes from the irradiation direction that is set by the setting unit, the control unit changes responsiveness of the drive unit that changes the irradiation direction of the irradiation light from the light-emitting portion into the irradiation direction that is set by the setting unit.

17 Claims, 6 Drawing Sheets

(51) Int. Cl.
*H04N 5/225* (2006.01)
*H05B 47/16* (2020.01)
*H05B 47/155* (2020.01)
*G03B 15/04* (2021.01)
*H04N 5/235* (2006.01)

(56) References Cited

FOREIGN PATENT DOCUMENTS

| | | |
|---|---|---|
| CN | 104423122 A | 3/2015 |
| CN | 104583862 A | 4/2015 |
| CN | 105372906 A | 3/2016 |
| CN | 105407292 A | 3/2016 |
| JP | 2003156783 A | 5/2003 |
| JP | 2013-92747 A | 5/2013 |
| JP | 2014081474 A | 5/2014 |
| JP | 2015-4932 A | 1/2015 |
| JP | 2015-049280 A | 3/2015 |
| JP | 2015-194576 A | 11/2015 |
| JP | 2017-083720 A | 5/2017 |
| WO | 2013/161225 A1 | 10/2013 |

* cited by examiner

ILLUMINATION DEVICE CAPABLE OF CHANGING IRRADIATION DIRECTION OF IRRADIATION LIGHT FROM LIGHT-EMITTING PORTION, IMAGING APPARATUS, AND METHOD OF CONTROLLING THE SAME

CROSS-REFERENCE TO RELATED APPLICATIONS

This application is a Continuation of International Patent Application No. PCT/JP2018/021337, filed Jun. 4, 2018, which claims the benefit of Japanese Patent Application No. 2017-114359, filed Jun. 9, 2017, both of which are hereby incorporated by reference herein in their entirety.

TECHNICAL FIELD

The present invention relates to an illumination device, and particularly to, an illumination device that automatically changes the irradiation direction of irradiation light from a light-emitting portion.

BACKGROUND ART

In known flash photography (referred to below as bounce flash photography), an illumination device radiates light to, for example, a ceiling to irradiate an object with diffuse reflection light from, for example, the ceiling. The bounce flash photography enables the object to be indirectly irradiated with the light from the illumination device without direct irradiation and enables imaging with soft light. It is necessary for the irradiation direction of the illumination device to be changed into an appropriate direction for appropriate bounce flash photography. A user is required to have a technical skill in order to manually change the irradiation direction into the appropriate direction in consideration for a distance to the object and a distance to the ceiling. In view of this, an imaging apparatus is proposed to automatically change the irradiation direction of the illumination device into the appropriate direction (automatic bounce), and the imaging apparatus includes an illumination device that is equipped with a distance-measuring unit to measure the distance to the object and the distance to the ceiling and calculates the irradiation angle of the bounce flash photography on the basis of distance information.

Japanese Patent Laid-Open No. 2013-92747 discloses a strobe device that is capable of immediately changing the current irradiation direction of strobe light into a desired irradiation direction in a photography mode in which the irradiation direction of the strobe light is always directed to the desire direction.

However, the technique in Japanese Patent Laid-Open No. 2013-92747 carries a risk that, when a user changes the direction of the light-emitting portion to set a newly desired irradiation direction, the direction of the light-emitting portion is automatically returned to the previous desired irradiation direction before the user operates an operation portion to store the desired irradiation direction.

SUMMARY OF INVENTION

To achieve the above object, an illumination device according to the present invention includes a light-emitting portion, a drive unit that changes an irradiation direction of irradiation light from the light-emitting portion, a setting unit that sets the irradiation direction of the irradiation light from the light-emitting portion, and a control unit that controls the drive unit. Depending on a cause of which the irradiation direction of the irradiation light from the light-emitting portion changes from the irradiation direction that is set by the setting unit, the control unit changes responsiveness of the drive unit that changes the irradiation direction of the irradiation light from the light-emitting portion into the irradiation direction that is set by the setting unit.

Further features of the present invention will become apparent from the following description of exemplary embodiments with reference to the attached drawings.

DESCRIPTION OF EMBODIMENTS

Figure 1:
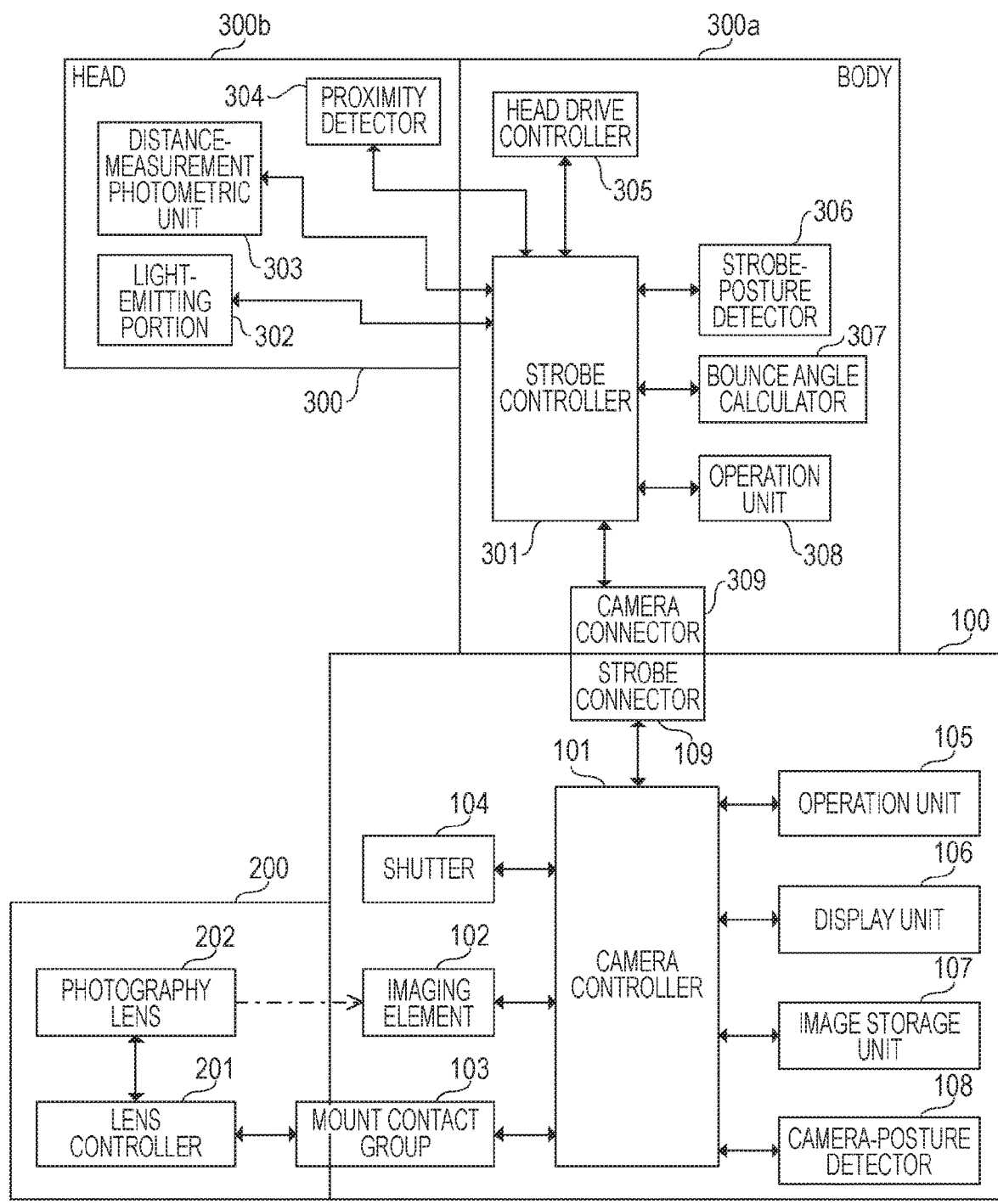
FIG. 1 is a block diagram of the structure of a camera system according to an embodiment of the present invention.

Preferred embodiments of the present invention will hereinafter be described in detail with reference to the attached drawings. FIG. 1 illustrates a block diagram of the structure of a camera system that includes a strobe device 300 that corresponds to an illumination device according to an embodiment of the present invention, a camera body 100 that corresponds to an imaging apparatus, and a lens 200 that corresponds to a lens unit. The lens 200 is detachably mounted on a front surface of the camera body 100. The camera body 100 and the lens 200 are electrically connected to each other with a mount contact group 103 interposed therebetween. The strobe device 300 is removably mounted on an upper surface of the camera body 100. The camera body 100 and the strobe device 300 are electrically connected to each other with a strobe connector 109 interposed therebetween.

A camera controller 101 is a microcomputer that controls operations of components of the camera body 100. An imaging element 102 converts light incident thereon from an object via a photography lens 202 into an electrical signal to generate image data and outputs the image data to the camera controller 101. A focal-plane shutter 104 is disposed between the imaging element 102 and the photography lens 202 and operates in response to an instruction of the camera controller 101.

An operation portion 105 includes an operation member that is operated by a user, detects user operations into the operation member such as a button, a switch, and a dial that the camera body 100 includes, and sends a signal depending on an operational instruction to the camera controller 101. The operation portion 105 outputs, to the camera controller 101, an instruction signal (referred to below as a SW1 signal) that is sent when the user carries out a half push operation of a release button and an instruction signal (referred to below as a SW2 signal) that is sent when the user carries out a full push operation of deeply pushing the release button. A display unit 106 displays photography information or photographed images in response to an instruction of the camera controller 101.

A camera-posture detector 108 obtains information about left and right slopes and front and rear slopes of the camera body 100 in the direction of gravity with, for example, an accelerometer to detect the posture of the camera body 100.

The camera controller 101 controls the operation of the camera body 100 on the basis of an output signal of the operation portion 105. When the output signal of the operation portion 105 is the SW2 signal, an aperture stop in the photography lens 202 is driven, the sensitivity (ISO sensitivity) of the imaging element 102 is set, and the focal-plane shutter 104 is controlled to cause the imaging element 102 to expose light. The camera controller 101 causes the display unit 106 to display a photographed image on a screen on the basis of image data that is obtained from the imaging element 102 and controls writing the image data to an image storage unit 107.

The structure of the lens 200 will now be described. A lens controller 201 is a microcomputer that controls the operation of components of the lens 200. The photography lens 202 includes lenses with which the imaging element 102 images an object image. The photography lens 202 has the aperture stop (not illustrated) for adjusting the amount of light and includes, for example, a focus lens (not illustrated) for adjusting a focus. Information about distance from the imaging apparatus to a focal plane can be obtained from information about the position of the focus lens. The lens controller 201 is controlled by using the mount contact group 103, adjusts the amount of light incident on the camera and the focus in accordance with an instruction from the camera controller 101, and notifies the camera controller 101 of the information about the distance.

The structure of the strobe device 300 will now be described. The strobe device 300 includes a body 300a that corresponds to a first housing and a head 300b that corresponds to a second housing. The head 300b is connected to the body 300a so as to be capable of rotating in the horizontal direction and the vertical direction relatively to the body 300a. With a camera connector 309 facing in the direction of gravity, the direction toward the camera connector 309 of the body 300a is referred to as a downward direction, rotation with an axis parallel to the vertical direction of the body 300a being a rotation center is referred to as rotation in the horizontal direction, and rotation with an axis perpendicular to the vertical direction being a rotation center is referred to as rotation in the vertical direction. With the strobe device 300 mounted on the camera body 100, a back side of the camera body 100 is referred to as a rear side of the body 300a, and a front side of the camera body 100 is referred to as a front side of the body 300a. A strobe controller 301 is a microcomputer that controls operations of components of the strobe device 300. The strobe controller 301 can communicate with the camera controller 101 via the camera connector 309 and can receive information about the camera and information about a strobe.

A light-emitting portion 302 includes a discharge tube, a light emission capacitor, a light emission circuit, and a light emission optical system and can emit a flash. The light-emitting portion 302 drives the light emission circuit in response to an instruction of the strobe controller 301, discharges energy that is charged in the light emission capacitor to the discharge tube for light emission, and irradiates the object with light by using the light emission optical system. A light source of the light-emitting portion 302 is not limited to the discharge tube and may be a LED.

The strobe controller 301 can receive a control signal from the camera controller 101 via the camera connector 309 and can cause the light-emitting portion 302 to emit light in synchronism with photography operation of the camera body 100.

A distance-measurement photometric unit 303 receives light that is emitted from the light-emitting portion 302 and that is reflected from a distance-measurement object and outputs information about the amount of the received light to the strobe controller 301.

The strobe controller 301 calculates the distance to the distance-measurement object on the basis of the amount of the received light.

A method of measuring the distance is not particularly limited and may be, for example, a laser distance measurement method.

A proximity detector 304 detects infrared that is radiated from a human body and outputs the infrared to the strobe controller 301. Consequently, it can be detected that the human body is near the head 300b. The proximity detector 304 may not be a sensor that detects the infrared but may be a resistive-film touch sensor or an electrostatic-capacity touch sensor.

A head drive controller 305 enables the head 300b to rotate in the horizontal direction and the vertical direction with respect to the body 300a by using a motor in response to an instruction from the strobe controller 301. The amount of rotation (drive amount) is detected by, for example, a rotary encoder and outputted as a relative angle with respect to the body 300a to the strobe controller 301. The relative angle represents the degree of rotation from when the head 300b is located at a predetermined position with respect to the body 300a. Driving the head 300b enables the light-emitting portion 302 and the distance-measurement photometric unit 303 to be moved to positions opposite to the distance-measurement object. The head 300b can be manually rotated in the horizontal direction and the vertical direction without the drive of the motor. At this time, the drive amount can also be outputted as the relative angle with respect to the body 300a to the strobe controller 301.

A strobe-posture detector 306 obtains the information about the left and right slopes and the front and rear slopes of the body 300a in the direction of gravity with, for example, an accelerometer to detect the posture of the strobe device 300. For example, the accelerometer that is used to obtain the information about the slopes of the body 300a is disposed in the body 300a.

A bounce angle calculator 307 calculates a bounce angle suitable for bounce photography on the basis of the information that is obtained by the distance-measurement photometric unit 303 and the information that is obtained by the strobe-posture detector 306. A method of calculating the bounce angle by using the bounce angle calculator 307 may be a method disclosed in, for example, Japanese Patent Laid-Open No. 2015-4932. Specifically, the bounce angle may be calculated as a bounce angle (the irradiation direction of the strobe light) when the object is irradiated at a predetermined angle with the strobe light that is reflected from a reflection body such as a ceiling. The bounce angle represents the irradiation direction of the strobe light and differs from the rotation angle of the head 300b.

An operation portion 308 includes various operation members that serve as input units that receive user operations. The operation portion 308 includes a light-emission-mode-setting button, an automatic-bounce-instructing button, an irradiation-direction-setting button, and various operation buttons and outputs user input operations to the strobe controller 301.

First Embodiment

Figure 2:
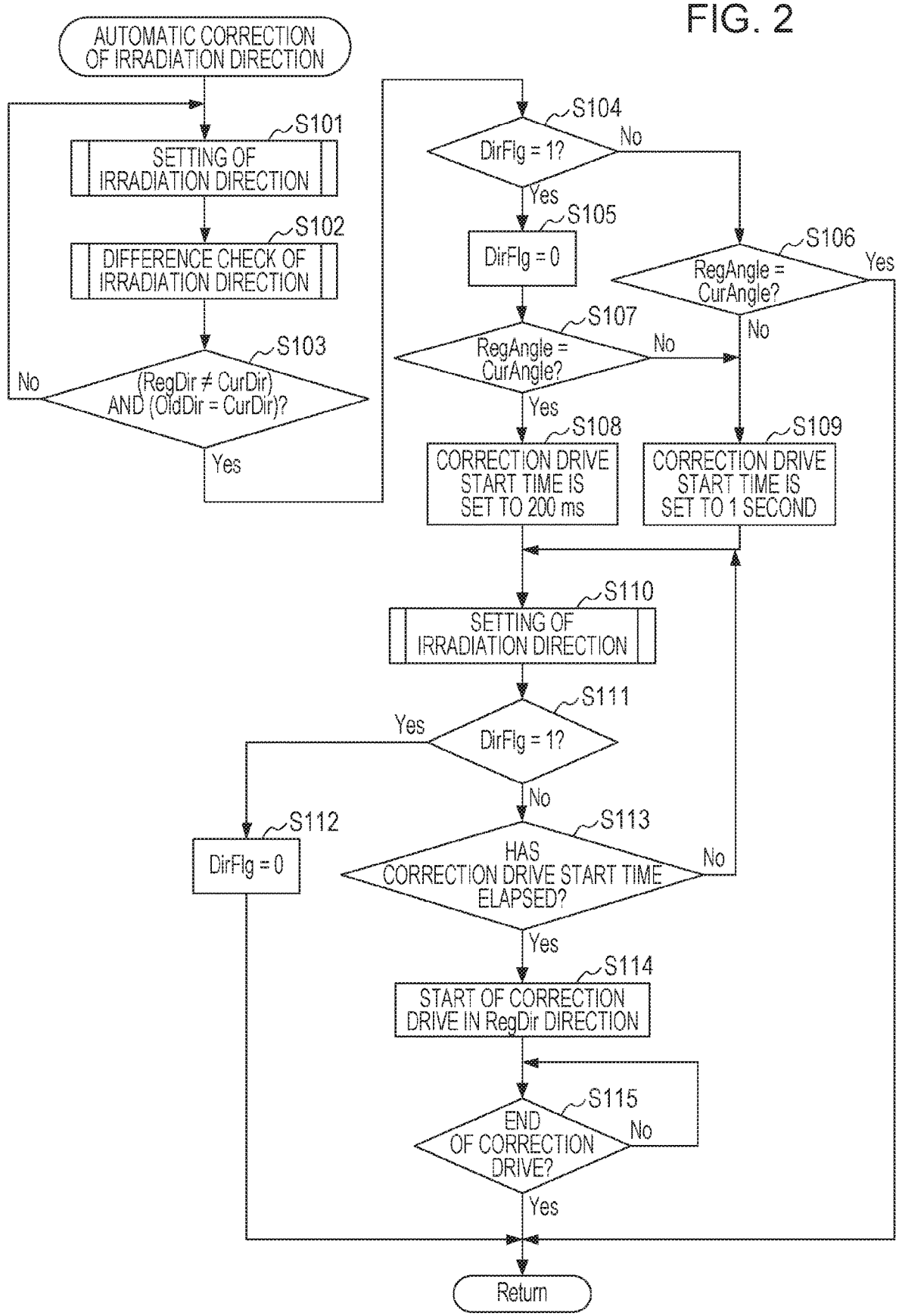
FIG. 2 is a flowchart of an operation of automatic correction of an irradiation direction according to a first embodiment of the present invention.
Figure 3:
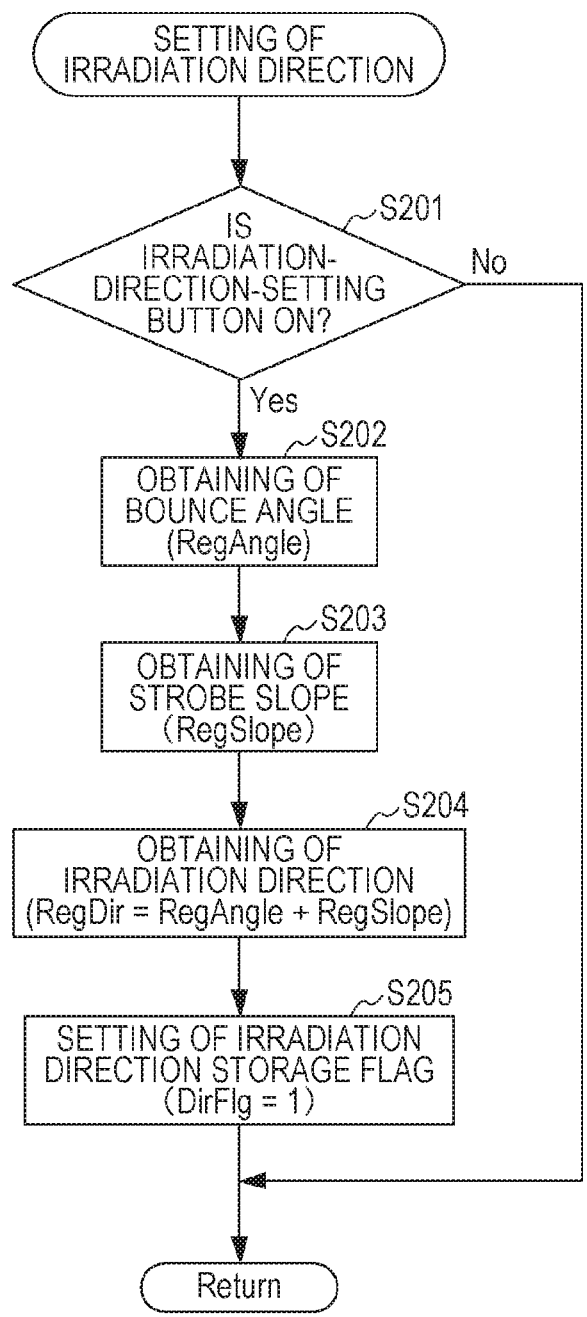
FIG. 3 is a flowchart of a subroutine of setting the irradiation direction according to the embodiment of the present invention.
Figure 4:
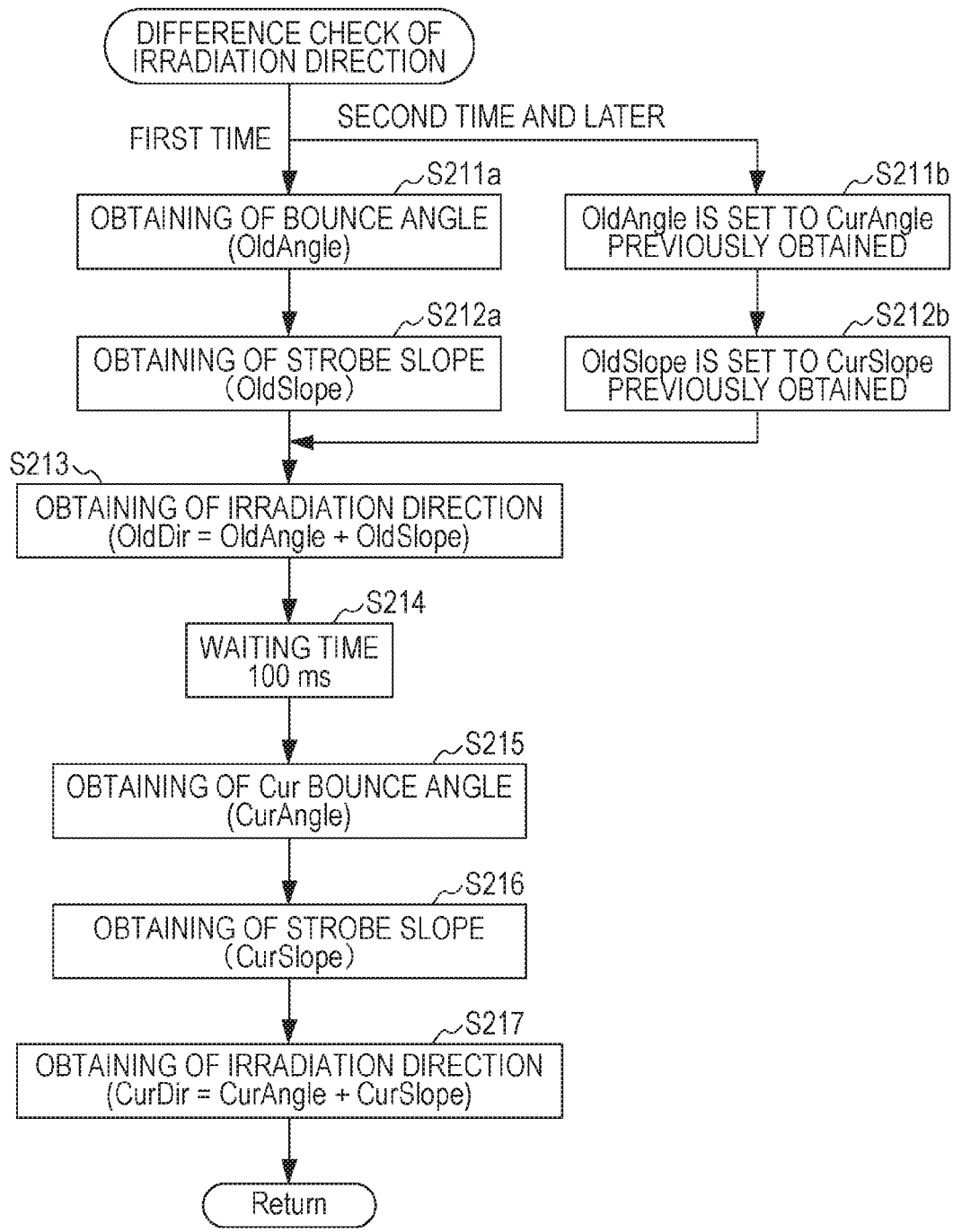
FIG. 4 is a flowchart of a subroutine of difference check of the irradiation direction according to the embodiment of the present invention.

An operation of automatic correction of the irradiation direction according to a first embodiment of the present invention will now be described with reference to FIG. 2 to FIG. 4. FIG. 2 is a flowchart of the operation of the automatic correction of the irradiation direction, which is periodically performed with the power of the strobe device 300 on.

A step S101, which is a subroutine of setting the irradiation direction, will be described in detail with reference to FIG. 3. FIG. 3 is a flowchart of the subroutine of setting the irradiation direction that is performed by the strobe controller 301.

At a step S201, whether the irradiation direction is set is determined.

In the case where the irradiation-direction-setting button of the operation portion 308 is operated (ON), the flow proceeds to a step S202. In the case where the irradiation-direction-setting button is not operated, a process of setting the irradiation direction is finished.

At the step S202, current rotation angles in the vertical direction and the horizontal direction, which are relative angles of the head 300b, are obtained from the head drive controller 305 and stored as set angles (RegAngle) in a RAM, not illustrated, in the strobe controller 301.

At a step S203, the slopes of the body 300a are obtained from the strobe-posture detector 306 and stored as set strobe body slopes (RegSlope) in the RAM, not illustrated, in the strobe controller 301.

At a step S204, the irradiation direction of the strobe light (irradiation light) is defined as a combination of the rotation angles of the head 300b and the slopes of the body 300a and stored as a set irradiation direction (RegDir=RegAngle+RegSlope) in the RAM, not illustrated, in the strobe controller 301. For example, in the case where the rotation angles of the head 300b are 90 degrees in the upward direction and 0 degrees in the horizontal direction, and the slopes of the body 300a are 10 degrees in the forward direction and 0 degrees in the horizontal direction, the set irradiation direction is represented by 80 degrees in the upward direction and 0 degrees in the horizontal direction. For another example, in the case where the rotation angles of the head 300b are 0 degrees in the vertical direction and 90 degrees in the right direction and the slopes of the body 300a are 0 degrees in the forward-backward direction and 0 degrees in the left direction, the set irradiation direction is represented by 90 degrees in the upward direction and 0 degrees in the horizontal direction although the head 300b is not rotated in the upward direction.

At a step S205, a flag for determining whether the irradiation direction is stored is determined to be DirFlg=1 and stored in the RAM, not illustrated, in the strobe controller 301, and the subroutine of setting the irradiation direction is finished. The initial value of RegAngle, RegSlope, and RegDir that are stored in the RAM in the subroutine is 0.

A subsequent step S102, which is a subroutine of difference check of the irradiation direction, will be described in detail with reference to FIG. 4. FIG. 4 is a flowchart of the subroutine of the difference check of the irradiation direction that is performed by the strobe controller 301, and a process performed at the first time after the power of the strobe device 300 is switched on differs from processes performed at the second time and later.

In the process performed at the first time, the current rotation angles in the vertical direction and the horizontal direction, which are the relative angles of the head 300b, are obtained from the head drive controller 305 at a step S211a and stored as past angles (OldAngle) in the RAM, not illustrated, in the strobe controller 301.

At a step S212a, the slopes of the body 300a are obtained from the strobe-posture detector 306 and stored as past strobe body slopes (OldSlope) in the RAM, not illustrated, in the strobe controller 301.

At a step S213, the irradiation direction of the strobe light, which is defined as the combination of the rotation angles of the head 300b and the slopes of the body 300a, is stored as a past irradiation direction (OldDir=OldAngle+OldSlope) in the RAM, not illustrated, in the strobe controller 301.

At a step S214, the process is waited a predetermined time (for example, 100 ms) to detect the irradiation direction at a regular time interval.

At a step S215, the current rotation angles in the vertical direction and the horizontal direction, which are the relative angles of the head 300b, are obtained from the head drive controller 305 and stored as current angles (CurAngle) in the RAM, not illustrated, in the strobe controller 301.

At a step S216, the slopes of the body 300a are obtained from the strobe-posture detector 306 and stored as current strobe body slopes (CurSlope) in the RAM, not illustrated, in the strobe controller 301.

At a step S217, the irradiation direction of the strobe light, which is defined as the combination of the rotation angles of the head 300b and the slopes of the body 300a, is stored as a current irradiation direction (CurDir=CurAngle+CurSlope) in the RAM, not illustrated, in the strobe controller 301. The subroutine of the difference check of the irradiation direction is finished.

At the second time and later, a process at a step S211b is performed instead of the process at the step S211a, and a process at a step S212b is performed instead of the process at the step S212a.

At the step S211b, the past angles (OldAngle) are set to the values of the current angles (CurAngle) that is obtained at the last step S215 and stored in the RAM, not illustrated, in the strobe controller 301.

At the step S212b, the past strobe body slopes (OldSlope) are set to the values of the current strobe body slopes (CurSlope) that are obtained at the last step S216 and stored in the RAM, not illustrated, in the strobe controller 301.

At the second time and later, the bounce angle and a strobe slope are obtained once in the subroutine of the difference check of the irradiation direction, as described above.

At a subsequent step S103, the strobe controller 301 compares values obtained in the subroutines at the steps S101 and S102. The flow proceeds to a step S104 in the case where the set irradiation direction (RegDir) differs from the current irradiation direction (CurDir), and the past irradiation direction (OldDir) does not differ from the current irradiation direction (CurDir), otherwise the flow returns to the step S101, and the subroutines are performed again. In the case where the current irradiation direction differs from the set irradiation direction due to some factor (cause) and this state is maintained (the irradiation direction is not changing), the flow proceeds to the step S104.

At the step S104, the strobe controller 301 determines whether the irradiation direction is stored (whether DirFlg=1 is satisfied). If the irradiation direction is stored, the flow proceeds to a step S105. If not, the flow proceeds to a step S106.

At the step S105, the strobe controller 301 sets DirFlg=0, and the flow proceeds to a step S107.

At the step S106, the strobe controller 301 compares the set angles (RegAngle) and the current angles (CurAngle). If there is a difference therebetween, the flow proceeds to a step S109. If not, the operation of the automatic correction of the irradiation direction is finished.

At the step S107, the strobe controller 301 compares the set angles (RegAngle) and the current angles (CurAngle). If there is a difference therebetween, the flow proceeds to the step S109. If not, the flow proceeds to a step S108.

At the steps S108 and S109, the strobe controller 301 sets a start time (timing of start) of operation for drive in the set irradiation direction (RegDir). At the step S108, the start time is set to a first time (for example, 200 ms). At the step S109, the start time is set to a second time (for example, 1 second) longer than the first time. The strobe controller 301 starts time measurement with a timer in the strobe controller 301 at the steps S108 and S109.

In the case where the set irradiation direction (RegDir) differs from the current irradiation direction (CurDir), the cause of the difference can be postural variation of the body 300a or angular variation of the head 300b. The case where the cause is the postural variation of the body 300a frequently occurs when a composition is changed, for example, the posture of the camera body 100 is changed from horizontal posture to vertical posture. In this case, the irradiation direction is preferably changed into an intentional irradiation direction for the user quickly and automatically.

The case where the cause is the angular variation of the head 300b occurs while the user manually moves the head 300b to set the next set irradiation direction (RegDir). In this case, a manual user operation is hindered by automatically changing the irradiation direction. However, the case where the cause is the angular variation of the head 300b occurs not only while the user manually moves the head 300b but also when the head 300b comes into contact with an obstacle.

In this case, the irradiation direction is preferably changed into the intentional irradiation direction for the user quickly and automatically.

For this reason, if the set angles (RegAngle) differ from the current angles (CurAngle), start of the operation of the automatic correction is delayed so as not to hinder the manual user operation. However, if the start of the operation of the automatic correction is excessively delayed, the operation of the automatic correction is not started for a long time in the case where the head 300b comes into contact with an obstacle. Accordingly, the start time is set in consideration for balance therebetween.

At a step S110, the strobe controller 301 performs the subroutine of setting the irradiation direction. At a step S111, the strobe controller 301 determines whether the irradiation direction is stored (whether DirFlg=1 is satisfied). If the irradiation direction is stored, the flow proceeds to a step S112. If not, the flow proceeds to a step S113. That is, when the irradiation direction is stored (set) at the step S110, the strobe controller 301 cancels the operation of the automatic correction.

At the step S112, the strobe controller 301 sets DirFlg=0, and the operation of the automatic correction of the irradiation direction is finished.

At the step S113, the strobe controller 301 determines whether the start time set at the step S108 or S109 has passed. If the start time has not passed, the flow proceeds to the step S110. If the start time has passed, the flow proceeds to a step S114.

At the step S114, the strobe controller 301 instructs the head drive controller 305 to start the operation of the automatic correction of the irradiation direction such that the irradiation direction becomes the set irradiation direction (RegDir).

At a step S115, the strobe controller 301 determines whether the operation of the automatic correction is performed such that the irradiation direction becomes the set irradiation direction (RegDir), and the operation of the automatic correction continues until the irradiation direction becomes the set irradiation direction (RegDir). The determination process at the step S115 may determine whether the current angles (CurAngle) obtained at the step S115 in the same manner as at the step S215 satisfy the set irradiation direction (RegDir)=the current irradiation direction (CurDir).

According to the present embodiment as above, an example of a process of changing the responsiveness of the head drive controller 305 includes changing the timing of the start of the operation of the automatic correction. This enables the irradiation direction to be automatically changed without hindering manual setting of the irradiation direction.

Second Embodiment

Figure 5:
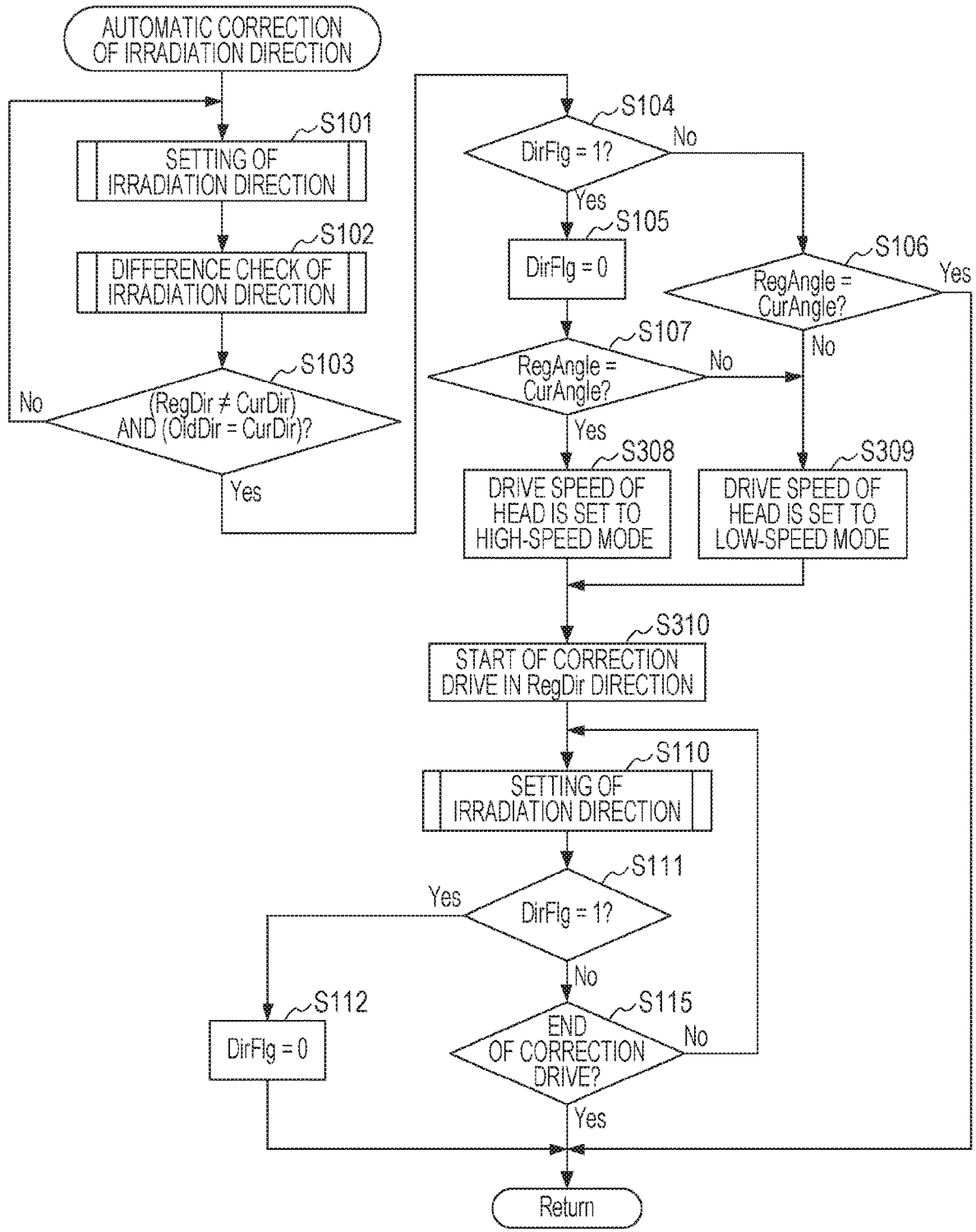
FIG. 5 is a flowchart of an operation of the automatic correction of the irradiation direction according to a second embodiment of the present invention.

An operation of the automatic correction of the irradiation direction according to a second embodiment of the present invention will now be described with reference to FIG. 3 to FIG. 5. FIG. 5 is a flowchart of the operation of the automatic correction of the irradiation direction, which is periodically performed with the power of the strobe device 300 on. In FIG. 5, steps at which the same processes as in FIG. 2 are performed are designated by numbers like to those in FIG. 2, and only steps at which processes that differ from those in FIG. 2 are performed will be described in detail.

At the step S107, the strobe controller 301 compares the set angles (RegAngle) and the current angles (CurAngle). If there is a difference therebetween, the flow proceeds to a step S309. If not, the flow proceeds to a step S308.

At the steps S308 and S309, the strobe controller 301 sets the drive speed of the head 300b for drive in the set irradiation direction (RegDir). At the step S308, the drive speed is set to a first speed (high-speed mode). At the step S309, the drive speed is set to a second speed (low-speed mode) lower than the first speed.

At a step S310, the strobe controller 301 instructs the head drive controller 305 to start the operation of the automatic correction of the irradiation direction such that the irradiation direction becomes the set irradiation direction (RegDir) at the drive speed set at the step S308 or S309. Subsequently, the strobe controller 301 stops the operation of the automatic correction when the irradiation direction is stored (set) at the step S110.

According to the present embodiment as above, another example of the process of changing the responsiveness of the head drive controller 305 includes changing the drive speed of the operation of the automatic correction of the irradiation direction, although according to the first embodiment, the timing of the start of the operation of the automatic correction of irradiation direction is changed. The change in the drive speed enables the irradiation direction to be automatically changed without hindering manual setting of the irradiation direction as in the case where the start time of the operation of the automatic correction is changed.

Third Embodiment

Figure 6:
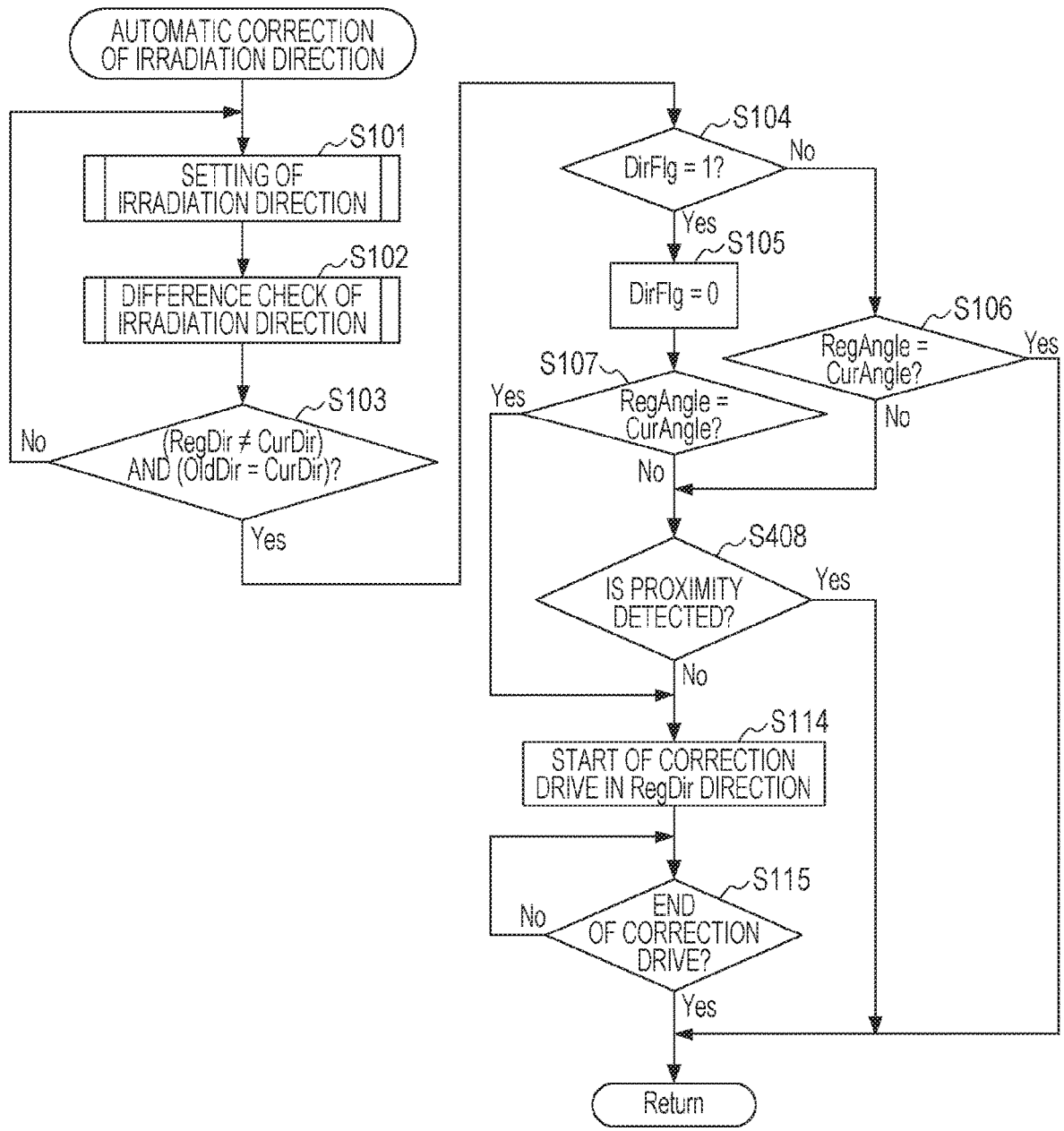
FIG. 6 is a flowchart of an operation of the automatic correction of the irradiation direction according to a third embodiment of the present invention.

An operation of the automatic correction of the irradiation direction according to a third embodiment of the present invention will now be described with reference to FIG. 3, FIG. 4, and FIG. 6. FIG. 6 is a flowchart of the operation of the automatic correction of the irradiation direction, which is periodically performed with the power of the strobe device 300 on. In FIG. 6, steps at which the same processes as in FIG. 2 are performed are designated by numbers like to those in FIG. 2, and only steps at which processes that differ from those in FIG. 2 are performed will be described in detail.

At the step S107, the strobe controller 301 compares the set angles (RegAngle) and the current angles (CurAngle). If there is a difference therebetween, the flow proceeds to a step S408. If not, the flow proceeds to the step S114.

At the step S408, the strobe controller 301 determines whether the user manually moves the head 300*b* on the basis of the result of detection by the proximity detector 304. In the case where the proximity detector 304 detects that the human body is near the head 300*b*, it is determined that the user manually moves the head 300*b*, and the operation of the automatic correction is finished. In the case where the proximity detector 304 does not detect that the human body is near the head 300*b*, it is determined that the head 300*b* comes into contact with an obstacle, and the flow proceeds to the step S114.

According to the present embodiment as above, the operation of the automatic correction is stopped if the change in irradiation direction is presumably caused by the user manually moving the head 300*b*. Accordingly, the irradiation direction can be automatically changed without hindering manual setting of the irradiation direction.

According to the above three embodiments, the slopes of the body 300*a* are obtained, as the strobe body slopes, from the strobe-posture detector 306. When the camera body 100 inclines with the strobe device 300 mounted on the camera body 100, the strobe device 300 also inclines. For this reason, the strobe controller 301 may obtain the slopes of the camera body 100 detected by the camera-posture detector 108, and the strobe body slopes may be the obtained slopes of the camera body 100.

Some of the processes performed by the strobe controller 301 according to the above three embodiments may be performed by the camera controller 101.

According to the above three embodiments, the strobe device 300, which can be removably mounted on the camera body 100, can automatically change the irradiation direction. However, a built-in strobe that can automatically change the irradiation direction may be used instead of the strobe device 300.

Each imaging apparatus described according to the above three embodiments can be removably equipped with the lens unit. However, the imaging apparatus may be integral with the lens unit.

Features according to the above three embodiments may be combined. For example, both of a correction drive start time and the drive speed may be changed. In addition, in the case where the user manually moves the head 300*b*, the start of the operation of the automatic correction may be delayed, or the drive speed may be decreased.

The preferred embodiments of the present invention are described above. The present invention, however, is not limited to the embodiments, and various modifications and alterations can be made within the range of the spirit thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An illumination device comprising:
a light-emitting portion;
a drive unit that changes an irradiation direction of irradiation light from the light-emitting portion;
a setting unit that sets the irradiation direction of the irradiation light from the light-emitting portion; and
a control unit that controls the drive unit,
wherein depending on a cause of which the irradiation direction of the irradiation light from the light-emitting portion is changed from the irradiation direction that is set by the setting unit, the control unit changes timing at which the drive unit starts an operation for changing the irradiation direction of the irradiation light from the light-emitting portion into the irradiation direction that is set by the setting unit.

2. The illumination device according to claim 1, further comprising:
a first housing;
a second housing that contains the light-emitting portion and that is capable of rotating relatively to the first housing; and
a detection unit that detects information about a relative position of the second housing with respect to the first housing,
wherein the drive unit rotates the second housing relative to the first housing to change the irradiation direction of the irradiation light from the light-emitting portion, and
wherein, when the irradiation direction of the irradiation light from the light-emitting portion differs from the irradiation direction that is set by the setting unit, the control unit changes timing at which the drive unit starts the operation for changing the irradiation direction of the irradiation light from the light-emitting portion into the irradiation direction that is set by the setting unit depending on whether a relative angle that is represented by the information that is detected by the detection unit differs from a relative angle at which the setting unit sets the irradiation direction.

3. The illumination device according to claim 2,
wherein the control unit uses the information that is detected by the detection unit with the irradiation direction of the irradiation light from the light-emitting portion differing from the irradiation direction that is set by the setting unit.

4. The illumination device according to claim 2, further comprising:
a posture detection unit that detects information about posture of the first housing; and
an operation unit that receives the operation for setting the irradiation direction by the setting unit,
wherein the setting unit sets the irradiation direction of the irradiation light from the light-emitting portion based on the information about the posture and the information about the relative position that are detected when the operation unit is operated.

5. The illumination device according to claim 4,
wherein, when the irradiation direction of the irradiation light from the light-emitting portion differs from the irradiation direction that is set by the setting unit, the control unit cancels or stops an operation of the drive unit when the operation unit is operated.

6. The illumination device according to claim 1, further comprising:
a first housing;
a second housing that contains the light-emitting portion and that is capable of rotating relatively to the first housing; and
a detection unit that detects information about a relative position of the second housing with respect to the first housing,
wherein the drive unit rotates the second housing relative to the first housing to change the irradiation direction of the irradiation light from the light-emitting portion, and
wherein, when the irradiation direction of the irradiation light from the light-emitting portion differs from the irradiation direction that is set by the setting unit, the control unit makes a difference between the responsiveness when a relative angle that is represented by the information that is detected by the detection unit is the same as a relative angle at which the setting unit sets the irradiation direction and the responsiveness when the relative angle that is represented by the information that is detected by the detection unit differs from the relative angle at which the setting unit sets the irradiation direction.

7. The illumination device according to claim 6,
wherein, when the irradiation direction of the irradiation light from the light-emitting portion differs from the irradiation direction that is set by the setting unit, the control unit makes timing of start of the operation of the drive unit when the relative angle that is represented by the information that is detected by the detection unit is the same as the relative angle at which the setting unit sets the irradiation direction later than the timing of the start of the operation of the drive unit when the relative angle that is represented by the information that is detected by the detection unit differs from the relative angle at which the setting unit sets the irradiation direction.

8. The illumination device according to claim 6,
wherein, when the irradiation direction of the irradiation light from the light-emitting portion differs from the irradiation direction that is set by the setting unit, the control unit makes a speed of the operation of the drive unit when the relative angle that is represented by the information that is detected by the detection unit is the same as the relative angle at which the setting unit sets the irradiation direction lower than the speed of the operation of the drive unit when the relative angle that is represented by the information that is detected by the detection unit differs from the relative angle at which the setting unit sets the irradiation direction.

9. The illumination device according to claim 1,
wherein the control unit changes a speed of the drive unit that changes the irradiation direction of the irradiation light from the light-emitting portion into the irradiation direction that is set by the setting unit.

10. The illumination device according to claim 1, further comprising:
an operation unit that receives the operation for setting the irradiation direction by the setting unit,
wherein, when the irradiation direction of the irradiation light from the light-emitting portion differs from the irradiation direction that is set by the setting unit, the control unit cancels or stops the operation of the drive unit when the operation unit is operated.

11. The illumination device according to claim 1,
wherein the control unit changes the timing at which the drive unit starts the operation for changing the irradiation direction of the irradiation light from the light-emitting portion into the irradiation direction that is set by the setting unit between when the cause of which the irradiation direction of the irradiation light from the light-emitting portion is changed from the irradiation direction that is set by the setting unit is a manual user operation and when the cause is no manual user operation.

12. The illumination device according to claim 11,
wherein, when the cause of which the irradiation direction of the irradiation light from the light-emitting portion is changed from the irradiation direction that is set by the setting unit is the manual user operation, the control unit makes the timing of the start of the operation of the drive unit later than that when the cause of which the irradiation direction of the irradiation light from the light-emitting portion is changed from the irradiation direction that is set by the setting unit is no manual user operation.

13. The illumination device according to claim 11,
wherein the control unit changes a speed of the operation of the drive unit that changes the irradiation direction of the irradiation light from the light-emitting portion into the irradiation direction that is set by the setting unit between when the cause of which the irradiation direction of the irradiation light from the light-emitting portion is changed from the irradiation direction that is set by the setting unit is the manual user operation and when the cause is no manual user operation.

14. The illumination device according to claim 13,
wherein, when the cause of which the irradiation direction of the irradiation light from the light-emitting portion is changed from the irradiation direction that is set by the setting unit is the manual user operation, the control unit makes the speed of the operation of the drive unit lower than that when the cause of which the irradiation direction of the irradiation light from the light-emitting portion is changed from the irradiation direction that is set by the setting unit is no manual user operation.

15. The illumination device according to claim 11,
wherein a speed and timing of start of the operation of the drive unit that changes the irradiation direction of the irradiation light from the light-emitting portion into the irradiation direction that is set by the setting unit are changed between when the cause of which the irradiation direction of the irradiation light from the light-emitting portion is changed from the irradiation direction that is set by the setting unit is the manual user operation and when the cause is no manual user operation.

16. An imaging apparatus that is removably equipped with an illumination device including a light-emitting portion, a drive unit that changes an irradiation direction of irradiation light from the light-emitting portion, and a setting unit that sets the irradiation direction of the irradiation light from the light-emitting portion, the imaging apparatus comprising:

a control unit that controls the drive unit, wherein depending on a cause of which the irradiation direction of the irradiation light from the light-emitting portion is changed from the irradiation direction that is set by the setting unit, the control unit changes timing at which the drive unit starts an operation for changing the irradiation direction of the irradiation light from the light-emitting portion into the irradiation direction that is set by the setting unit.

17. A method of controlling an irradiation direction of irradiation light from an illumination device including a light-emitting portion, a drive unit that changes the irradiation direction of the irradiation light from the light-emitting portion, and a setting unit that sets the irradiation direction of the irradiation light from the light-emitting portion, the method comprising:

changing, depending on a cause of which the irradiation direction of the irradiation light from the light-emitting portion is changed from the irradiation direction that is set by the setting unit, time at which the drive unit starts an operation for changing the irradiation direction of the irradiation light from the light-emitting portion into the irradiation direction that is set by the setting unit.

* * * * *